United States Patent [19]
Lewis

[11] 4,285,482
[45] Aug. 25, 1981

[54] WING LEADING EDGE HIGH LIFT DEVICE

[75] Inventor: Delbert S. Lewis, Bellevue, Wash.

[73] Assignee: The Boeing Company, Seattle, Wash.

[21] Appl. No.: 65,403

[22] Filed: Aug. 10, 1979

[51] Int. Cl.³ .................. B64C 21/08; B64C 9/24; B64C 3/44

[52] U.S. Cl. .................. 244/207; 244/210; 244/214; 244/218; 244/219

[58] Field of Search ........... 244/207, 210, 214, 218, 244/219

[56] References Cited

U.S. PATENT DOCUMENTS

| 2,541,565 | 2/1951 | Ziegler | 244/210 |
|---|---|---|---|
| 2,740,597 | 4/1956 | Wittman | 244/214 |
| 2,886,264 | 5/1959 | Seager | 244/207 |
| 3,093,350 | 6/1963 | Wilkins | 244/207 |
| 3,831,886 | 8/1974 | Burdges et al. | 244/214 |
| 3,904,152 | 9/1975 | Hill | 244/214 |
| 3,987,983 | 10/1976 | Cole | 244/219 |

FOREIGN PATENT DOCUMENTS 1907710 8/1970 Fed. Rep. of Germany ........... 244/214

*Primary Examiner*—Charles E. Frankfort

*Attorney, Agent, or Firm*—H. Gus Hartmann; Bernard A. Donahue

[57] ABSTRACT

A wing leading edge high-lift generating device in the form of a spanwise slat segment having both an upper and a lower surface, faired into an airfoil configured leading edge of a relatively stationary portion of the wing therebehind and movable with respect thereto by a downwardly extending hinge arm pivotally related to a downwardly extending hinge bracket from the wing within a fairing structure which also includes an actuator between the hinge arm and bracket for biasing the hinge arm connected to the leading edge device away from and downwardly with respect to the hinge bracket of the wing about the pivotal connection therewith. Further, the wing leading edge slat device has a large cavity formed between the upper and lower surfaces thereof, which cavity is readily adaptable for the insertion of a large duct for blowing pressurized air through a nozzle and an aerodynamic slot formed between the leading edge slat and the relatively stationary airfoil configured leading edge of the wing therebehind when the leading edge slat is moved outwardly and downwardly. In another embodiment the leading edge slat has its movement guided by an extendable track.

18 Claims, 9 Drawing Figures

WING LEADING EDGE HIGH LIFT DEVICE

BACKGROUND OF THE INVENTION

1. Field of the Invention

This invention relates to a wing leading edge high-lift generating device which is intended to improve the high speed maneuvering performance of an airplane and also, the low speed performance for landing and take-off. In order to attain efficiency at cruise, high performance aircraft generally employ high wing loadings or small wing areas. This results in excessively high speeds for landing and take-off, and necessitates long runways; so, auxiliary high-lift generating devices are generally employed to augment wing lift at low airspeeds for reducing the runway length required for landing operations and to reduce criticality of aerodynamic control.

2. Description of the Prior Art

The auxiliary high-lift generating devices used to augment wing lift at low airspeeds, are usually of two types: trailing edge flaps; and leading edge flaps or slats. The trailing edge flaps are extensible panels which, by extending aft of the normal trailing edge position, increase wing area and usually also camber. The leading edge slat comprises a portion of the wing leading edge structure and is extended forward and downward, generally on tracks, to increase wing area and camber. The leading edge flap or Krueger type flap comprises a portion of the lower wing surface structure adjacent to the wing leading edge: and this flap is generally hinged at its forward extremity, to fixed support structure in the upper portion of the wing leading edge. For its active or operational position, the flap is extended forward and downward about its hinge axis to increase wing area and camber. All such auxiliary high-lift generating devices usually incorporate means such as an aerodynamic slot, to maintain streamwise airflow attachment over the upper surface of the wing to prevent stalling of the wing at high angles-of-attack.

SUMMARY OF THE INVENTION

The leading edge auxiliary high-lift generating device described in this invention provides functions attained by conventional leading edge flaps or slats, with additional functions not previously attained, and it accomplishes these functions in a manner allowing maximum simplicity of both support and actuation. Conventional functions provided include: chordwise extension for increased wing area; increased camber, with smoothly contoured upper surface; and means of air inflow and of aerodynamic slot tailoring to provide auxiliary energy for airflow attachment, if this energy is required and if not, to provide a simple, smoothly contoured upper surface for streamlined airflow. Additional functions provided include: provision of a smoothly contoured slat member with a full bull-nose leading edge and a smooth lower skin extending well aft of the airflow stagnation point; the availability of a large internal space due to an external support hinge arrangement for providing adequate space for a large duct which is capable of providing a high-flow volume of pressurized air for a wing leading edge blowing system; means of providing a drooped wing leading edge for producing an airfoil camber that is suitable for high-speed maneuvering and cruise operation; a structural support comprising an external hinge incorporating a single pivot axis, with an external fairing that can allow optimized proportions for an actuator; and said externally positioned actuator producing rapid extension of the slat for high-g maneuvering without wing stall.

For the take-off mode of operation, the airplane is generally operated at higher angles-of-attack than for the landing mode and it is with the airplane at the higher angle-of-attack attitude that generates the questionable attachment of the streamwise airflow to the upper surface of the wing; and it is at these high angles-of-attack where it is most desirable to have the effectiveness of an aerodynamic slot. During the landing mode of airplane operation, the gross-weight has generally decreased substantially due to fuel load burn-off, so that it does not become necessary to rotate the airplane attitude to high angles-of-attack for maximum lift generation and therefore the need for the effectiveness of an aerodynamic slot is reduced.

An advantage of this invention is that the entire wing leading edge airfoil section, forward of the front wing spar, comprises an extensible slat, which when moved to a partially extended position, produces a variable camber wing or a cambered airfoil envelope that can be useful at higher airspeeds than conventionally known wing leading edge flaps or slats. This makes the invention also useful for a loiter mode operation of an airplane. Intermediate positions of slat extension will benefit such loiter mode operation of the airplane and will also be of assistance in both an engine-out situation and in-route altitude ceilings for twin-engined aircraft in particular. An FAA performance requirement for twin-engined airplanes is to fly at 15,000 feet with a one-percent climb gradient, following a single engine failure; and the reason for this is to be capable of clearing obstacles such as the Rocky Mountains when flying out of Denver, Co. Also, the Mach number requirement for that engine-out condition, in the case of a twin-jet engined airplane like the Boeing 737, is about 0.45 to 0.50 and the Mach number for the wing airfoil section design is approximately 0.8. Therefore, at the lower engine-out Mach numbers, there could be a substantial improvement in the wing airfoil envelope shape of present known airplanes to reduce the aerodynamic drag conditions when either take-off or landing, high-lift devices are utilized; and the leading edge slat and panel combination of this invention, provides such a means for increasing the wing airfoil envelope camber with a very slight increase in aerodynamic drag. Further, an additional benefit can be realized in that the total gross-weight of the airplane that can be sustained at 15,000 feet, is greatly increased and it would not be necessary to have the slat in the fully extended position to realize this benefit, it may very well be sufficient to extend the slat only half way. Therefore, an object of this invention is to provide a high-lift leading edge slat device having simplicity and effectiveness, and multiple usage, because: known slats generally can not be used for providing a variable airfoil camber at the higher cruise speed of modern jet airplanes, other than for landing or take-off airspeeds; and an external hinging or pivot geometry of the slat, further provides the very simplest and sturdiest mechanism for producing variable wing camber.

A STOL (Short Take-Off and Landing) type airplane requires a high-lift device for the wing, that has extremely high lift-coefficients; and the attainment of the necessary lift characteristics can be through a high-pressure leading edge blowing system, whereby flow energy can be added to the streamwise airflow over the upper wing surface for decreasing the possibility of boundary layer airflow separation and resulting wing stall conditions. Pressurized airflow can be derived from a jet engine compressor section through a bleed air duct system from which there is almost an unlimited supply provided that there is sufficient space available throughout the wing structure for getting a large enough volume of pressurized airflow through the aerodynamic slot and over the upper surface of the wing leading edge. Therefore, an object of this invention is to provide a large space in the interior of the wing leading edge for housing a large duct to provide a blowing system for STOL type aircraft.

DETAILED DESCRIPTION OF THE DRAWINGS

FIGS. 1 to 4 illustrate a preferred first embodiment of this invention and its various features referred to hereinafter.

Figures 1, 3A:
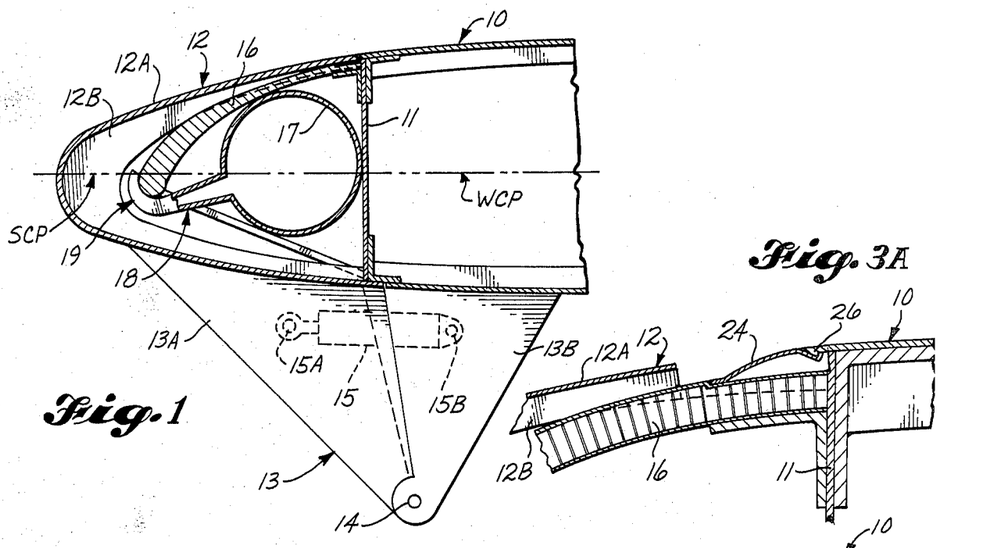
FIG. 1 is a chordwise cross-sectional view of the leading edge slat of the present invention, which is supported externally below the wing airfoil profile by a faired hinge arm, in a fully retracted or stowed position whereat the external contour of the slat substantially completes both the upper and lower leading edge profile of the wing to a position chordwise aft to approximately the front wing spar.
FIG. 3A is an enlarged detailed chordwise cross-sectional view of the upper trailing edge slat, including a spring biased fairing for reducing surface discontinuity produced by an exposed surface indentation when the slat is at the slightly extended position shown in FIGS. 2 and 3.

FIG. 1 is a chordwise cross-sectional view of a forward portion of a wing 10 having a symmetrical airfoil section with a blunt leading edge profile which would be more applicable to a high subsonic, laminar flow, wing. Substantially the entire wing leading edge profile, forward of the front wing spar 11, is comprised of a slat 12 which is shown in a fully retracted or stowed position for generally high-speed cruise operation of an airplane. With the slat 12 in this position, the SCP (slat chord plane) is in alignment with the WCP (wing chord plane) and there is substantially no exposed gap or surface discontinuity over either the upper or the lower surface of the wing airfoil section at the juncture of the slat 12 to the relatively stationary portion of the wing. The cross-sectional thickness of the slat 12 comprises an external surface or skin 12A which is contoured to the wing airfoil section profile and a spanwise series of slat ribs 12B for chordwise structural rigidity. As depicted in FIG. 1 the slat 12 is at a fully retracted or stowed position, whereat the external contour of the skin 12A substantially completes both the upper and the lower leading edge profile of the wing airfoil cross-section to a chordwise distance aft to approximately the front wing spar 11. The slat 12 is supported externally and below the wing airfoil envelope by a faired hinge arrangement 13 comprising a movable forward fairing section or arm 13A hinged at 14 to a fixed aft fairing section or support bracket 13B which is rigidly fastened to wing structure. Located within the hinge fairing envelope 13 is an actuator 15 which is connected at its forward end 15A to an arm 13A and at its aft end 15B to the support bracket 13B. The size of the external hinge fairing is such that it is possible to completely enclose and house the actuator 15 within the fairing surface contour. The actuator 15 can be made to almost any length or size within the fairing envelope, e.g., it can be made to have a very short stroke length by being situated at a relatively short radial distance from the hinge axis; but, there is a practical actuator size limitation. Also, the external hinging arrangement permits the actuator 15 to be positioned at a relatively short radial distance from the hinge axis 14 for producing a very short and rapid, moment arm actuation and response; in comparison to, an internally housed actuator within the wing airfoil envelope that is generally of a long slender type and produces a longer actuation response period. The external hinging arrangement also allows the utilization of a relatively short and stubby actuator, as opposed to the long slender type, which results in less columnar bending. Because the actuator 15 is completely enclosed by the fairing 13, it would be necessary to extend the slat 12 fully to the position shown in FIG. 4 in order to provide access to the interior of the fairing 13 from the opening formed between the fore and aft halves 13A and 13B of the fairing, for installing or servicing the actuator. The bolts or pins that fasten the ends 15A and 15B of the actuator to fairing, could be made to penetrate the skin of the fairing; and the bolt heads or nuts for fastening the ends of the actuator to the fairing, can be recessed in a pocket or indentation on each side of the hinge fairing, with a cover plate fastened thereover so that there would be flush or continuous surface fairing.

Housed in the interior of the wing leading edge section between the slat 12 and the front wing spar 11, is a contoured panel 16 whose function it is to provide a smooth upper contour, without any aerodynamic surface discontinuities, upon extension of the slat 12, as hereinafter described.

The external contour of panel 16 is not necessarily influenced entirely by the cross-sectional thickness of the slat 12. Procedurally, in the design of wing leading edge high-lift devices, the first consideration is to determine the necessary wing lift characteristics to provide the landing and take-off modes of airplane operation; and then to select the type of high-lift device that will accomplish the task. If a wing leading edge slat device, as disclosed in the present invention, is chosen, then the cross-sectional thickness of the contoured skin 12A of the slat and the depth of the slat ribs 12B will determine the maximum internal space available for housing the relatively stationary leading edge portion of the wing, including the panel 16. Therefore, the appearance of the cross-sectional thickness of the slat depicted in the figures, comprising both the thickness of the contoured skin 12A and the depth of the slat rib 12B.

Also housed in the large space available in the interior of the wing leading edge section, forward of the front wing spar 11, is a tubular duct 17 having a spanwise spaced distribution manifold 18 with ejection nozzles 19 which are operative, upon extension movement of the slat 12 from the stowed position, for directing pressurized airflow bleed from a jet-engine compressor (not shown) over the upper surface of the wing. This amount of space, occupied by the duct 17, is generally not available in known leading edge high-lift devices because of linkages or cam track mechanisms and actuators within this area. The larger the duct, the more useful it is in blowing an exceptionally large amount of air over the wing surface for usage on STOL (short take-off and landing) type aircraft.

Figures 2, 3:
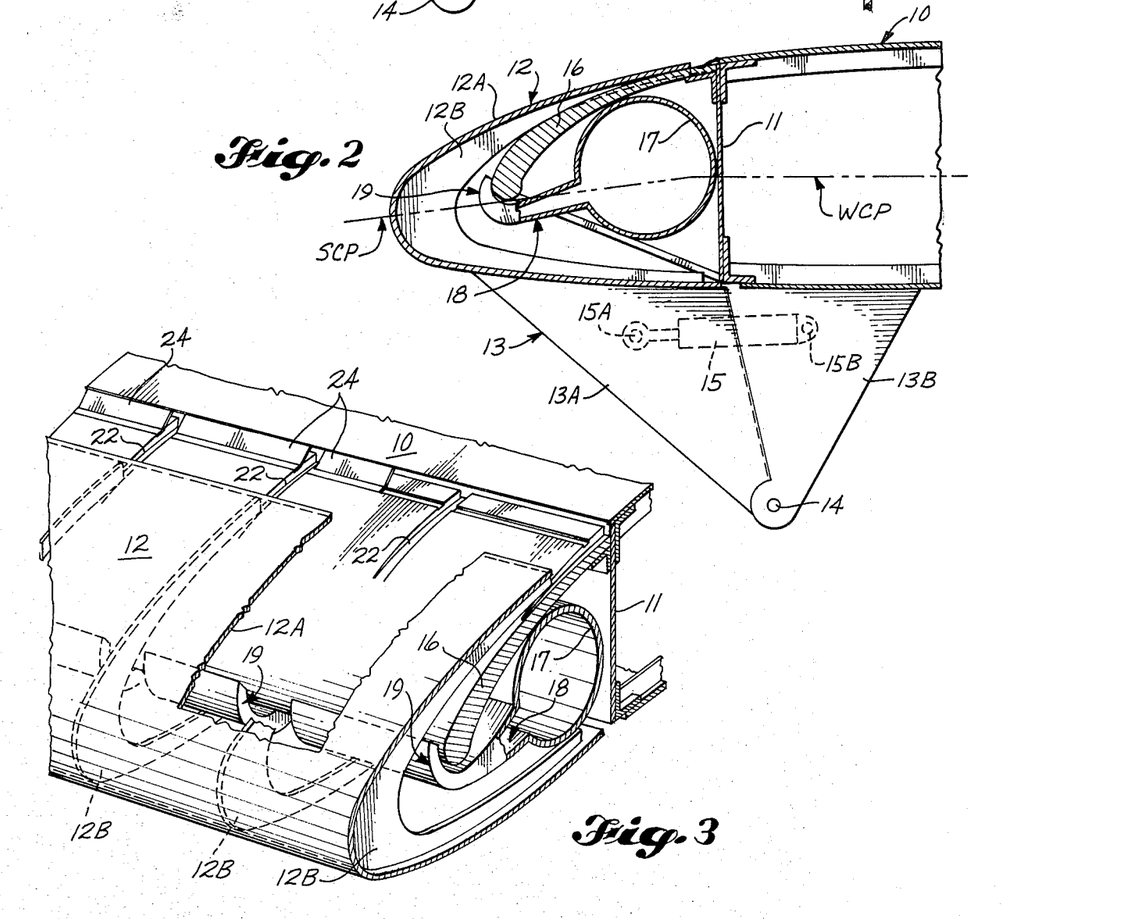
FIG. 2 is a view similar to FIG. 1 with the leading edge slat slightly extended to an operative position whereat: the SCP (slat chord plane) is at a downward angle-of-deflection relative to the WCP (wing chord plane) without producing any gap or exposed surface discontinuity over either the upper or the lower surface of the overall wing airfoil cross-section profile, and the wing airfoil camber is increased for utilization at medium or high speed cruise flight or high-g maneuvering of the aircraft.
FIG. 3 is a perspective view of the slat at an extended position similar to FIG. 2, with parts shown broken away to more clearly disclose a relatively large tubular duct, a spanwise distribution manifold and nozzle arrangement for a wing leading edge high-pressure blowing system.

FIG. 2 is a view similar to FIG. 1 with the leading edge slat 12 at a slightly extended position; and FIG. 3 is a perspective view of the slat 12 also at a slightly extended position similar to FIG. 2, with parts broken away to more clearly show the internal arrangement of the relatively large tubular duct 17 and the spanwise high-pressure flow distribution manifold 18 with the series of exhaust nozzles 19 for the blowing system.

Referring to FIGS. 2 and 3, with the leading edge slat 12 at a slightly extended position, the SCP (slat chord plane) is at a downward angle-of-deflection relative to the WCP (wing chord plane) and produces a drooped leading edge on the wing airfoil section for modifying the airfoil section camber. Some high performance aircraft, such as military fighters, would be greatly benefitted by having the ability to rapidly increase the wing airfoil camber at high airspeeds and while undergoing high-g maneuvers, in order to prevent wing stall. To attain a high wing section camber efficiency, it will be noted that along the undersurface of the slat, that there is a sliding overlap relationship between the slat skin 12A and the relatively stationary portion of the wing leading edge. This is to provide complete closure of the cambered airfoil undersurface for preventing airflow leakage that would affect the aerodynamic characteristics and also to provide a smooth surface contour without any discontinuities. There is a similar complete closure of the cambered airfoil upper surface by the contoured panel 16 which becomes exposed upon extension of the slat 12, to also prevent aerodynamic airflow leakage when the slat 12 is in the partially extended position shown in FIGS. 2 and 3. Further, with the slat 12 at this slightly extended position, the wing airfoil camber is increased without producing any gap or exposed surface discontinuity over either the upper or the lower surface of the overall airfoil profile and this allows, this position of the slat 12, to be utilized at high-speed cruise flight or for high-g maneuvering of the aircraft without encountering the normally associated wing stall problems. Also, to prevent aerodynamic airflow leakage through the external hinge fairing 13, the trailing edge of the forward hinge fairing 13A partially overlaps the leading edge of the aft hinge fairing 13B. This sturdily externally hinged slat structure, when combined with the relatively short stroke actuator 15, is particularly adaptable for rapid actuation under high-g loads when directly controlled or commanded by suitable sensed signals.

Figure 4:
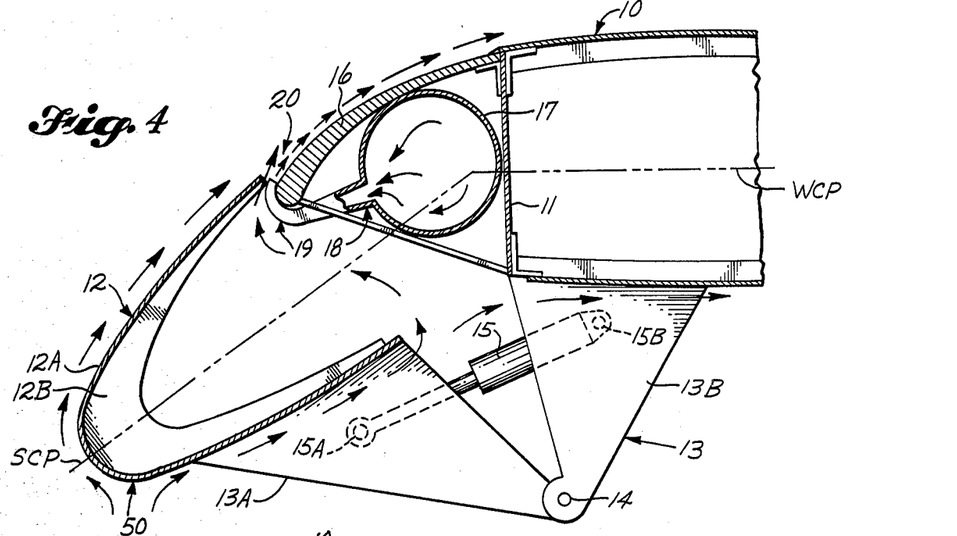
FIG. 4 is a view similar to the preceding views of FIGS. 1 and 2, showing the slat at a further extended operative position, whereat a contoured panel is exposed on the upper surface of the wing, and an aerodynamic slot is formed between the slat and the relative stationary portion of the wing leading edge.

FIG. 4 is a view similar to the preceding views of FIGS. 1 and 2, and shows the wing leading edge slat 12 in the fully extended position, whereat the complete upper surface of the contoured panel 16 is exposed and an aerodynamic slot 20 is formed between the upper trailing edge of the slat 12 and the relative stationary contoured panel member 16.

The upper surface contour of panel 16, shown in FIGS. 1–4 is tailored so that the aerodynamic slot 20 which is uncovered, is proportional to the degree of slat 12 extension i.e., the size of the aerodynamic slot 20 is made to increase as the slat 12 extends; because, a greater amount of blown airflow is required through the aerodynamic slot 20, as both the exposed upper surface area of panel 16 increases and the slat angle-of-deflection increases. The reason for the aerodynamic slot 20, is to maintain streamwise boundary layer airflow attachment to the upper surface of the wing at the higher angle-of-deflection positions of the extended slat 12. Conversely, as shown in FIGS. 2 and 3, the angle-of-deflection of the slat 12 is so small, that no aerodynamic slot is required. Because aerodynamic slots always add drag and loss of lift, they are a total loss within themselves; but, the work they do more than pays for the expense of the loss of lift and drag that they generate.

The sizing of the aerodynamic slot 20, is the result of the radial geometry of the slat 12 being different from the radial geometry of the panel 16. In order for the upper surface of panel 16 to be contoured such that no aerodynamic slot is uncovered as the slat is extended, the panel 16 is contoured along an annular or radial arc having its center at the hinge axis 14; thereby, the upper trailing edge of the slat 12 is made to move tangentially adjacent to the upper surface of panel 16 without a gap therebetween, to form a continuous smooth surface.

Further, the slotted or non-slotted relationship of the slat 12 and the panel 16, can be either fixed or variable, depending upon the result desired, as is more clearly shown and described hereinafter.

Referring to FIG. 4, because of a feathering out of the upper trailing edge of the slat 12 or making it fairly thin, it may be possible that by getting both a streamwise airflow over the upper surface of the slat 12 and an airflow through the aerodynamic slot area 20, that a pressure unbalance oscillation or an alternating pressure fluctuation could be created on either side of the trailing edge and this could induce vibration or flutter of the trailing edge. However, there is an alternative solution to this problem and that is to make the upper trailing edge surface of that slat 12, instead of a feather edge, a finite thickness for providing a measure of structural rigidity thereto. But, in so doing, when the slat 12 is in an extended position there would be a discontinuity produced by the indentation left in the upper surface of the stationary leading edge of the wing by the departure of the abutting slat trailing edge thickness. Referring to FIG. 3A, to take out that thickness discontinuity, a thin gage sheet metal strip 24 is fastened along a forward spanwise edge to the upper surface of panel 16. The metal strip 24 has its aft spanwise edge spring biased upward to rest against a stop formed by a slight leading edge flange 26 on the wing skin, so that when the slat 12 with its blunt trailing edge is extended, the metal strip 24 would spring upward from its nested position against the upper surface of panel 16 and by the combined action of spring bias and low pressure, the metal strip 24 would be pulled up tightly against the upper wing skin edge flange 26 to form a relatively smooth and continuous upper surface contour.

Referring to the perspective view of FIG. 3 which shows the slat 12 at a partial forward extended position, it will be noted that when the slat 12 is forwardly extended, that indentations such as slots or channels 22 are also exposed in the upper surface of the relatively stationary panel 16. These channels 22 occur at the same predetermined spanwise spacing as the slat ribs 12B and provide a nesting space for the rib depth, as the slat 12 is moved aft toward the stowed or retracted position. The chordwise cross-sectional thickness of the panel 16 can be made to accommodate the full depth of the mating slat rib 12B; or, the entire panel 16 can be press-formed into the desired contour, including the channel indentations 22 from a relatively thin gage sheet of metal or made up as a preformed composite material panel.

Since, for the greater part of the effective spanwise area of the panel 16, its upper skin surface would be raised to the height shown in-between the channel indentations 22, the upper skin of the panel 16 could be in sliding contact with the undersurface of the slat skin 12A as shown in FIG. 2 and thereby provide a zero or non-aerodynamic slot arrangement; or in the alternative, any size of aerodynamic slot can be provided by further tailoring the contour of the upper surface of panel 16 as described hereinafter.

Figures 5, 6, 7, 8:
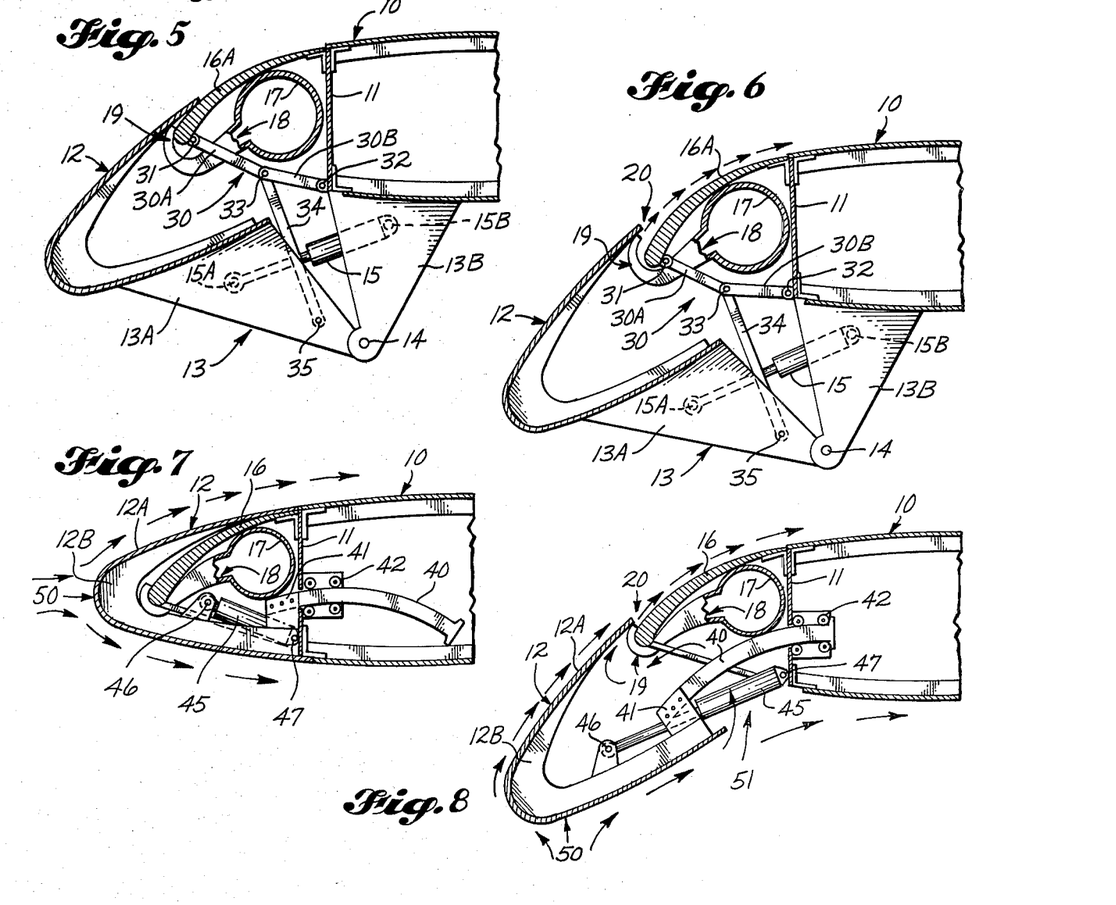
FIG. 5 is a chordwise cross-sectional view of a second embodiment of the leading edge slat at an extended operative position, whereat a contoured panel is exposed, on the upper surface of the wing, having a leading edge support comprising a toggle linkage for altering the angle-of-deflection of the panel in proportion to the degree of slat extension.
FIG. 6 is a view similar to the preceding view of FIG. 5, showing the slat at a further extended operative position, whereat the exposed upper surface panel forms an aerodynamic slot having an opening sized in proportion to the degree of slat extension.
FIG. 7 is a chordwise cross-sectional view of a third embodiment of the leading edge slat which is supported internally within the wing airfoil profile by a track and roller arrangement, in a fully retracted or stowed position.
FIG. 8 is a view similar to the preceding view of FIG. 7, showing the slat at an extended position, whereat the exposed upper surface panel forms an aerodynamic slot having flow energy added by a pressure blowing system.

FIGS. 5 and 6 are chordwise cross-sectional views of a second embodiment of the invention and show a leading edge slat 12 and exposed panel 16A arrangement somewhat similar to that shown in FIGS. 1 to 4, with the exception that the exposed panel 16A is variably cambered. Those elements which are similar to those previously described have been given like reference numerals and where there are some differences in the elements, they have been identified with different numerals or a letter suffix has been added. The panel 16A is tapered in thickness chordwise aft, to allow chordwise flexural contouring connection to the front spar 11 of the wing 10. The leading edge of the flexural panel 16A is supported from the wing spar 11 by a toggle joint brace 30, comprising links 30A and 30B. The toggle joint brace 30 is connected at one end 31 to the leading edge of the chordwise flexural panel 16A and at the other end at 32 to the wing spar 11; and the toggle joint brace 30 is actuatably connected at toggle joint 33 to one end of drive link 34 and the other end of drive link 34 is connected at 35 to the faired hinge arm 13A. As the slat 12 is extended from a first forward operative position shown in FIG. 5 to a second forward operative position shown in FIG. 6, the exposed chordwise flexural panel 16A is moved from the non-slottd position depicted in FIG. 5 to the aerodynamic slot 20 configuration depicted in FIG. 6, by the toggle joint brace 30. The toggle joint brace 30 functions to alter the angle-of-deflection of the chordwise flexural panel 16A in proportion to the amount of forward extension of the slat 12; and thereby also, varies the size of the aerodynamic slot opening 20. The connection of drive link 34 to the faired hinge arm 13A at pivot 35, is through a relatively short radius arm 35-14 from the hinge axis 14 to produce a short stroke; because, only a slight movement of the leading edge of the panel 16A is required to produce a significant aerodynamic effect by variation of the slot opening 20.

From the standpoint of simplicity, there is little reason for making panel 16A a flexible member and then moving it by an actuator, between the aerodynamic slot or the non-slotted configuration. However, for certain types of aircraft, such as a twin-engined airplane which is generally utilized on short, high-density, passenger traffic routes where both the take-off and the landing mode of airplane operation require the ultimate in high-lift characteristics coupled with minimum drag, the increased complexity of a movable flexural panel 16A may pay off.

FIGS. 7 and 8 are chordwise cross-sectional views of a third embodiment of the wing leading edge slat; wherein, the slat 12 has an alternate means of support, i.e., by a track 40 and rollers 42. Those elements which are similar to those previously described have been given like reference numerals. FIG. 7 depicts the slat 12 in a fully retracted or stowed position whereat it is supported internally within the wing airfoil profile by the track and roller arrangement; and FIG. 8 depicts the slat at a fully forward extended position, whereat the exposed upper surface panel 16 forms an aerodynamic slot 20 and a pressure blowing system adds flow energy.

The extension geometry of the externally hinged slat 12 shown in FIGS. 1 to 6, can be exactly reproduced by means of a track and roller arrangement, by configurating the curvilinear geometry of the track about a virtual center corresponding to the actual center 14 previously shown. Also, the geometry of this arrangement can be modified for producing a greater amount of linear extension of the slat 12 with less of a change in angle-of-deflection, by straightening-out to some extent, the degree of curvature of the track 40. For certain applications, it may be that for the approximate proportions of the slat 12 and wing 10 arrangement shown in FIGS. 1 to 6, that the slat-to-hinge radial arm may be too short and that the track and roller arrangement may be better because it could be more easily modified to provide a greater amount of linear extension of the slat 12 in comparison to the degree of change in angle-of-deflection.

Referring to FIGS. 7 and 8, the lower rib section 12B of the extended slat 12 is of a relatively deep web construction in comparison to the upper section and this is of significance because the entire contour of the slat 12 is cantilevered forward off of the curved track member 40 i.e., the entire U-shaped leading edge contour of the slat 12 forms a cantilevered beam structure and the support for the cantilevered beam is at its extreme aft lower end attachment fitting 41. This rib construction differs from the external hinged slat 12 previously shown in FIGS. 1 to 6, wherein the lower slat rib section 12B is shown having a lesser rib depth or a thinner beam construction because the movable faired hinge arm 13A supports substantially the entire lower structure of the slat 12; and the slat rib depth or beam thickness then becomes less important because the entire slat is not cantilevered from the extreme of one end 41 as shown in FIG. 8. The critical bending point for the slat 12 as shown in FIGS. 1 to 6, then moves well forward toward the leading edge, which then becomes the main structural supporting point for the slat.

In FIGS. 7 and 8, the actuator 45 has to have a longer stroke length, than the actuator 15 shown in FIGS. 1 to 6, because it is positioned at a greater radial distance from the virtual hinge axis; and being longer and more slender, the actuator 45 therefore is less stable as a column. Also, actuator 45 has to describe substantially the entire linear extension andd retraction distance of the slat 12; whereas, the actuator 15, in FIGS. 1 to 6, being positioned radially closer to the hinge axis 14, can be made to function about a shorter effective moment arm and therefore can be constructed to have a shorter stroke length.

In FIGS. 7 and 8, the track and roller arrangement eliminates the external hinge excrescence, but is more complicated and less rigid than the external hinge; and shows some encroachment, by the track and roller mechanism, on the amount of internal volume available in the wing leading edge section for a blowing duct system. However, it will be noted that the track and roller mechanism is designed such that it is situated fairly close or adjacent to the wing undersurface, so that there is a minimum of encroachment on the space available for a large diameter duct 17 housed between the panel 16 and the front wing spar 11. The duct 17 has a forward projecting exhaust distribution duct 18 and nozzle 19 arrangement curved around the leading edge of the panel 16 for directing pressurized airflow over the upper surface of the panel 16 and the relatively stationary portion of the wing leading edge.

The dashed arrowhead lines indicate the airflow pattern obtained when the slat 12 is in the retracted position shown in FIG. 7 and the extended position shown in FIG. 8 having also an aerodynamic slot 20. Referring to FIG. 8, airflow from underneath the slat 12, or from the high pressure side of the airfoil, enters the cavity formed between the extended slat and the relatively fixed leading edge section of the wing, through a lower opening 51 which is well aft of the streamwise airflow stagnation point indicated at 50. From the duct 17, the distribution manifold 18 and nozzle 19, high pressure air is forced through the aerodynamic slot 20 and out onto the upper wing surface for adding energy to the upper, low-pressure boundary layer airflow; thereby, facilitating airflow attachment and laminar flow.

Referring to FIG. 8 and to the undersurface of the extended slat 12: a critical point, in the attachment characteristics of the streamwise airflow to the wing upper surface, is dependent upon the airflow stagnation point 50. As the angle-of-attack of the wing airfoil section increases, the stagnation point 50 tends to move aft chordwise along the undersurface of the extended slat 12; and as shown in FIG. 8, the stagnation point 50 has moved chordwise aft from the leading edge of the slat 12 shown in FIG. 7 toward the slat trailing edge and well into the smooth undersurface area of the slat. It should be noted, that the undersurface, chordwise-length of the slat 12 is sufficient to prevent any normal possibility of the stagnation point 50 moving off of the slat undersurface and into the gap area 51, between the lower trailing edge of the slat 12 and the forward fixed edge of the wing section 10. Therefore, the chordwise-length of the slat undersurface, presents a firm and smoothly continuous surface to the streamwise airflow, much in the same manner as when the slat 12 is in the fully retracted high-speed cruise position shown in FIG. 7.

Further, as the stagnation point 50 moves aft due to an increase in wing angle-of-attack, this forces the airflow forward of the stagnation point 50 to bend, as indicated by the dashed arrowhead lines depicting the streamwise airflow, and actually move forward around the bullnose or relatively blunt leading edge of the slat 12. Now, if the leading edge structure of the slat 12 were to define a sharp edge (not shown) then as the wing increased in angle-of-attack, a portion of the airflow would become trapped along the undersurface leading edge of the slat, by such sharp edge and the streamwise airflow would then be unable to move forward and around such sharp leading edge, resulting in a leading edge air-pressure build-up with a decrease in lift over the upper surface of the wing.

In summary, it should be noted that in addition to the features above described, one additional characteristic enhances the effectiveness of this invention. This relates to the fact that in either of the two supporting arrangements, external hinge or internal track, the support is well below the upper surface slot, and furthermore is separated therefrom by a large internal volume which essentially acts as a plenum chamber. The plenum chamber allows the airflow to re-form in a homogeneous flow pattern, completely eliminating the possibility of an airflow disturbance which could lead directly to airflow separation on the upper surface as with prior known arrangements having supporting arms, hinges, or tracks within the slot area. Upper surface separation is most critical on or near the leading edge because the separation can diverge very rapidly, causing a large loss of total lift on the wing.

While the invention has been disclosed with reference to presently preferred embodiments, it is to be understood that those modifications and changes which become obvious to a person skilled in the art as a result of the teachings herein, will be encompassed by the following claims.

What is claimed is:

1. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; means for externally hinging said spanwise slat segment to the undersurface of the airfoil for curvilinear extension and retraction movement relative to the airfoil; said external hinge means comprising, a support bracket extending downward from the undersurface of the airfoil, and a drive arm pivotally mounted to the lower end of the support bracket and having its swinging end fastened to the slat segment; said pivotal connection between the support bracket and the drive arm, forming the slat segment hinge axis; means for actuating the slat segment from a stowed position to a forward and downward extended operative position; a contoured panel member being secured at an aft portion to fixed structure of the airfoil and having a forward portion forming a fixed nose structure for the airfoil when said contoured panel member is exposed by forward curvilinear extension of the slat segment to form a continuous upper surface contour between said extended slat segment and the airfoil, and thereby providing both an increased cambered airfoil and an increased airfoil area; said panel member having an upper surface contoured along a radial arc that has a virtual center off-set from the slat segment hinge axis, for tailoring an aerodynamic slot between said slat segment and said panel member to increase in size proportional to the degree of slat segment extension for providing a greater amount of airflow through the aerodynamic slot as both the exposed upper contoured surface area of said panel member increases and said slat segment angle-of-deflection increases; thereby, maintaining streamwise boundary layer airflow attachment to the upper surface of the airfoil.

2. The leading edge high-lift generating device as set forth in claim 1, wherein: said actuating means are mounted to said external hinge means and interconnect the support bracket to the drive arm, in such a manner as to produce an amplified curvilinear extension stroke of the slat segment relative to the stroke length of said actuating means, whereby rapid slat segment extension and retraction response is provided for high-g maneuvering with a decrease in airfoil stall characteristics.

3. The leading edge high-lift generating device as set forth in claim 1, further including: a spring biased fairing means fastened to the aft upper surface of said panel member for aerodynamic fairing between the upper surface of said panel member and the upper surface of the airfoil, when said panel member is exposed by forward extension of the slat segment.

4. The leading edge high-lift generating device as set forth in claim 1, further including: a duct mounted within the airfoil leading edge section beneath said panel member; a distribution manifold spaced spanwise within the airfoil leading edge section and operatively connected to said duct; nozzles operatively connected to said distribution manifold for directing pressurized airflow between said slat segment and said panel member, over the upper surface of the airfoil; whereby, flow energy is added to the streamwise airflow for decreasing boundary layer separation over the upper surface of the airfoil.

5. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; means for externally hinging said spanwise slat segment to the undersurface of the airfoil for curvilinear extension and retraction movement relative to the airfoil; said external hinge means comprising, a support bracket extending downward from the undersurface of the airfoil, and a drive arm pivotally mounted to the lower end of the support bracket and having its swinging end fastened to the slat segment; means for actuating the slat segment from a stowed position to a forward and downward extended operative position; a contoured panel member being exposed by forward curvilinear extension of the slat segment to form a continuous upper surface contour between said extended slat segment and the airfoil, and thereby providing both an increased cambered airfoil and an increased airfoil area; a toggle joint brace interconnecting the leading edge of said contoured panel member to fixed structure of the airfoil; a drive link interconnecting said drive arm with said toggle joint brace; said toggle joint brace and drive link combination, altering the angle-of-deflection of said panel member for producing an aerodynamic slot between said slat segment and said panel member when said slat segment is forwardly extended from the airfoil.

6. The leading edge high-lift generating device as set forth in claim 5, wherein said toggle joint brace and drive link combination, alters the angle-of-deflection of said panel member so as to produce an aerodynamic slot opening, sized in direct proportion to the degree of slat segment extension from the airfoil.

7. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; means for externally hinging said spanwise slat segment to the undersurface of the airfoil for curvilinear extension and retraction movement relative to the airfoil; said external hinge means comprising, a support bracket extending downward from the undersurface of the airfoil, and a drive arm pivotally mounted to the lower end of the support bracket and having its swinging end fastened to the slat segment; actuating means for moving the slat segment from a stowed position to a forward and downward extended operative position; said actuating means being interconnectably mounted between said support bracket and said drive arm at a predetermined radial distance from a pivot axis of said external hinge means for producing an amplified length of curvilinear extension of said slat segment relative to the stroke length of said actuating means; and a contoured panel member being exposed by forward curvilinear extension of the slat segment to form a continuous upper surface contour between said extended slat segment and the airfoil, and thereby providing both an increased cambered airfoil and an increased airfoil area; a toggle joint brace interconnecting the leading edge of said contoured panel member to fixed structure of the airfoil; a drive link interconnecting said drive arm with said toggle joint brace; said toggle joint brace and drive link combination, altering the angle-of-deflection of said panel member for producing an aerodynamic slot between said slat segment and said panel member when said slat segment is forwardly extended from the airfoil.

8. The leading edge high-lift generating device as set forth in claim 7, wherein: said toggle joint brace and drive link combination, alters the angle-of-deflection of said panel member so as to produce a variable aerodynamic slot opening in direct proportion to the degree of slat segment extension from the airfoil.

9. The leading edge high-lift generating device as set forth in claim 7, further including: a duct mounted within the airfoil leading edge section beneath said panel member; a distribution manifold spaced spanwise within the airfoil leading edge section and operatively connected to said duct; nozzles operatively connected to said distribution manifold for directing pressurized airflow between said slat segment and said panel member, over the upper surface of the airfoil; whereby, flow energy is added to the streamwise airflow for decreasing boundary layer separation over the upper surface of the airfoil.

10. A wing having a leading edge high-lift generating device, comprising: a spanwise slat segment having both an upper and lower trailing edge surface faired into an airfoil configured leading edge for the wing, without any surface aerodynamic discontinuities, when in a retracted stowed position; external hinging means supported from the undersurface of the wing for pivotally mounting the slat segment for chordwise movement relative to the wing; said external hinging means comprising, a support bracket extending downward from the undersurface of the wing, and a drive arm pivotally mounted to the lower end of the support bracket and having its swinging end fastened to the undersurface of the slat segment for support thereof; said pivotal connection between the support bracket and the drive arm, forming the slat segment hinge axis; actuating means for moving the slat segment between a retracted position on said wing leading edge and an extended position spaced forwardly from said wing leading edge; a contoured panel member being secured at an aft portion to fixed structure of the wing and having a forward portion forming a fixed nose structure for the wing when said contoured panel member is exposed by forward extension of the slat segment and forming a smoothly continuous faired upper surface between said slat segment and the wing, for providing an increase in wing area and an increase in wing airfoil section camber; said panel member having an upper surface contoured along a radial arc that has a virtual center off-set from the slat segment hinge axis, for tailoring an aerodynamic slot between said slat segment and said panel member to increase in size proportional to the degree of slat segment extension for providing a greater amount of airflow through the aerodynamic slot as both the exposed upper contoured surface area of said panel member increases and said slat segment angle-of-deflection increases; thereby, maintaining streamwise boundary layer airflow attachment to the upper surface of the wing.

11. The leading high-lift generating device as set forth in claim 10, wherein: said actuating means being mounted to said external hinge means and interconnected between the support bracket and the drive arm, for producing an amplified curvilinear extension stroke of the slat segment, relative to the stroke length of said actuating means, due to said actuating means being at a shorter radial distance from an external hinge pivot axis; whereby, rapid slat segment extension and retraction response is provided for high-g maneuvering with a decrease in wing stall characteristics.

12. The leading edge high-lift generating device as set forth in claim 10, further including: a spring biased fairing means fastened to the aft upper surface of said panel member for aerodynamic fairing between the upper surface of said panel member and the upper surface of the airfoil, when said panel member is exposed by forward extension of the slat segment.

13. The leading edge high-lift generating device as set forth in claim 10, further including: a duct mounted within the wing leading edge section beneath said panel member; a distribution manifold spaced spanwise within the wing leading edge section and operatively connected to said duct; nozzles operatively connected to said distribution manifold for directing pressurized airflow between said slat segment and said panel member, over the upper surface of the wing, whereby flow energy is added to the streamwise airflow for decreasing boundary layer separation over the upper surface of the wing.

14. A wing having a leading edge high-lift generating device, comprising: a spanwise slat segment having both an upper and a lower trailing edge surface faired into an airfoil configured leading edge for the wing, without any surface aerodynamic discontinuities, when in a retracted stowed position; external hinging means supported from the undersurface of the wing for pivotally mounting the slat segment for chordwise movement relative to the wing; said external hinging means comprising, a support bracket extending downward from the undersurface of the wing, and a drive arm pivotally mounted to the lower end of the support bracket and having its swinging end fastened to the undersurface of the slat segment for support thereof; actuating means for moving the slat segment between a retracted position on said wing leading edge and an extended position spaced forwardly from said wing leading edge; a contoured panel member being exposed by forward extension of the slat segment and forming a smoothly continuous faired upper surface between said slat segment and the wing, for providing an increase in wing area and an increase in wing airfoil section camber; means for controllably bending said contoured panel member, comprising: a toggle joint brace pivotally connected at one end to the leading edge of said contoured panel member and pivotally connected at its other end to stationary structure of the airfoil for maintaining rigidity between the leading edge of said panel member and said airfoil structure, during normal aerodynamic airloads producing a lifting load on said panel member; an interconnecting link connected at one end to the toggle joint juncture and connected at its other end to said external hinge drive arm at a predetermined radial distance from the external hinge axis; and said toggle joint brace and said interconnecting link, in combination, bending said contoured panel member for producing an aerodynamic slot between said slat segment and said panel member when said slat segment is forwardly extended from the airfoil.

15. The leading edge slat high-lift generating device as set forth in claim 14, wherein: said toggle joint brace and said interconnecting link, in combination, vary the angle-of-deflection of said panel member in proportion to the degree of slat segment extension from the airfoil for producing a variable sized aerodynamic slot opening.

16. A wing having a leading edge high-lift generating device, comprising: a spanwise slat segment having both an upper and a lower trailing edge surface faired into an airfoil configured leading edge for the wing, without any surface aerodynamic discontinuities, when in a retracted stowed position; external hinging means supported from the undersurface of the wing for pivotally mounting the slat segment for chordwise movement relative to the wing; said external hinging means comprising, a support bracket extending downward from the undersurface of the wing, and a drive arm pivotally mounted to the lower end of the support bracket and having its swinging end fastened to the undersurface of the slat segment for support thereof; actuating means for moving the slat segment between a retracted position on said wing leading edge and an extended position spaced forwardly from said wing leading edge; said actuating means being interconnectably mounted between said support bracket and said drive arm at a predetermined radial distance from a pivot axis of said external hinging means for producing an amplified length of curvilinear extension of said slat segment relative to the stroke length of said actuating means; a contoured panel member being exposed by forward extension of the slat segment and forming a smoothly continuous faired upper surface between said slat segment and the wing, for providing an increase in wing area and an increase in wing airfoil section camber; a toggle joint brace pivotally connected at one end to the leading edge of said contoured panel member and pivotally connected at its other end to stationary structure of the airfoil for maintaining rigidity between the leading edge of said panel member and said airfoil structure, during normal aerodynamic airloads producing a lifting load on said panel member; an interconnecting link connected at one end to the toggle joint juncture and connected at its other end to said external hinge drive arm at a predetermined radial distance from the external hinge axis; and said toggle joint brace and said interconnecting link, in combination, bending said contoured panel member for producing an aerodynamic slot between said slat segment and said panel member when said slat segment is forwardly extended from the airfoil.

17. The leading edge slat high-lift generating device as set forth in claim 16, wherein: said toggle joint brace and said interconnecting link, in combination, vary the angle-of-deflection of said panel member in proportion to the degree of slat segment extension from the airfoil for producing a variable sized aerodynamic slot opening.

18. The leading edge high-lift generating device as set forth in claim 16, further including: a duct mounted within the wing leading edge section beneath said panel member; a distribution manifold spaced spanwise within the wing leading edge section and operatively connected to said duct; nozzles operatively connected to said distribution manifold for directing pressurized airflow between said slat segment and said panel member, over the upper surface of the wing, whereby flow energy is added to the streamwise airflow for decreasing boundary layer separation over the upper surface of the wing.

* * * * *